May 6, 1952  E. D. RANEY  2,595,813
ADJUSTABLE CONTROL MECHANISM
Filed Jan. 14, 1950

INVENTOR.
ELDON D. RANEY
BY Hudson, Boughton,
Williams, David & Hoffmann
ATTORNEYS

Patented May 6, 1952

2,595,813

UNITED STATES PATENT OFFICE 2,595,813

ADJUSTABLE CONTROL MECHANISM

Eldon D. Raney, Columbus, Ohio, assignor to Ranco Incorporated, Columbus, Ohio, a corporation of Ohio Application January 14, 1950, Serial No. 138,540

1 Claim. (Cl. 74—469)

The present invention relates to an adjustable control mechanism comprising a control device such as a valve or electric switch, actuated by an expansible, pressure responsive element and a spring opposing movement of the element.

It is common practice to adjust the operating characteristics of control mechanisms of the type mentioned by varying the tension of the spring so that the pressures at which the control device is operated may be set for that desired for any particular circumstances. In control mechanisms of this type it is sometimes desirable that the manual adjustment be effective to provide a relatively wide range of spring pressures, in which event considerable manual effort is required to change the spring tension throughout the range. The employment of the usual spring adjusting devices, which generally comprise screws or cams, is unsatisfactory as considerable effort is required to manipulate the manual control member through a convenient amplitude.

An object of the present invention is the provision of a control mechanism having a pressure responsive element adapted to operate a control device, a spring opposing the pressure responsive element, and manually operable mechanism associated with the spring for varying the spring loading effect on the element by altering the angular position of the spring and consequently its tension force direction to increase or decrease the spring force component affecting the element.

Another object of the invention is the provision of a control mechanism having a control lever operated by a pressure responsive element, a spring connected with the lever to oppose the pressure responsive element, and manually operable means for supporting the spring in various angular positions relative to the lever whereby the tension component of the spring tending to move the lever about its pivot can be varied with little effort and without changing the spring tension.

Other objects and advantages of the invention will be apparent from the description of the preferred form of the invention, reference being made to the accompanying drawings wherein.

Figure 1:
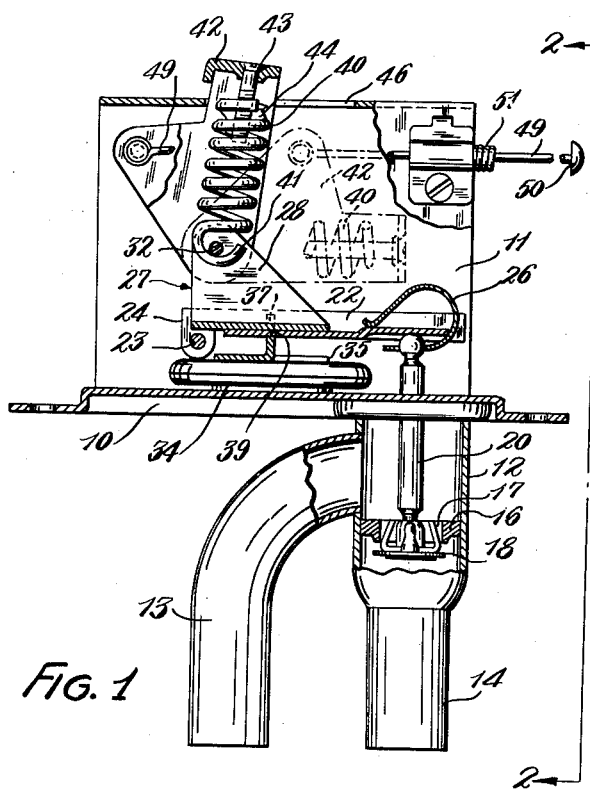
Fig. 1 is a sectional view of a thermostatically operated valve embodying the invention, the section being substantially along line 1—1 of Fig. 2.
Figure 2:
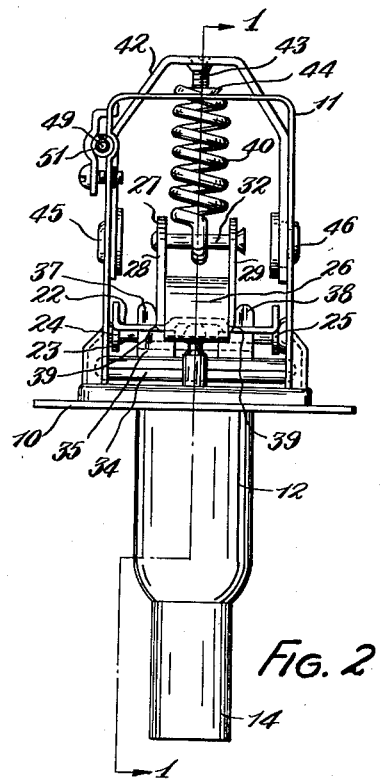
Fig. 2 is an end elevational view of the valve mechanism taken substantially along line 2—2 of Fig. 1.

The invention is particularly applicable to control mechanisms comprising a lever movable in opposite directions to actuate a control device, such as a switch or valve. The lever is moved in one direction by an expansible pressure responsive element and in the opposite direction by a spring connected with the lever and arranged to oppose the expansible element through the lever. One end of the spring is pivotally connected with the lever, and means is provided for supporting the spring to swing on its pivot relative to the lever whereby the force component of the spring tension acting to rotate the lever against the element can be alternated by merely shifting the angle of the spring relative to the lever arm with which the spring is connected. In the preferred form of the invention, the spring is supported by a pivoted member, and the axis of the pivot for the member extends substantially through the pivot of the connection between the spring and lever.

Referring to the drawings, the invention is shown embodied in a thermostatically operated fluid valve particularly suitable for controlling the flow of heating liquid through a space heating radiator such as that employed to warm passenger automobile interiors. The valve comprises a base plate 10 having the open end of a generally U-shaped sheet metal housing or frame 11 attached thereto to form an open ended box-like structure. A valve chamber 12 having an inlet 13 and an outlet 14, is attached to the underside of the plate 10. The chamber 12 includes an annular valve seat member 16 extending transversely thereof, which member provides a valve port 17 adapted to be closed by a valve plate 18 attached to one end of a valve stem 20. The upper end of the valve stem extends from the chamber and through an opening in the plate 10, and a suitable seal, such as a flexible diaphragm or membrane, is interposed between the sides of the chamber 12 and the stem 20 to prevent escape of fluid from the valve chamber while permitting longitudinal movement of the stem. The seal is not shown as such devices are well known in the art.

A channel shaped lever 22 is pivoted between the side walls of the frame 11 by a pin 23 having its ends journaled in the frame walls and extending through lugs 24, 25 formed at one end of the lever. The upper end of the valve stem 20 is connected with the lever 22 by a C-shaped spring 26 engaging the underside of a ball formation on the end of the stem and the upper surface of the lever 22 to resiliently maintain the stem in engagement with the underside of the lever. The lever 22 has an upwardly extending arm 27 which comprises a U-shaped bracket having triangular shaped sides 28, 29 and an intermediate or yoke portion 30 which is attached to the lever 22 proper in any suitable manner, as by welding, for example. The upper ends of the sides 28, 29 support a pin 32 which extends through openings in the sides.

Figure 3:
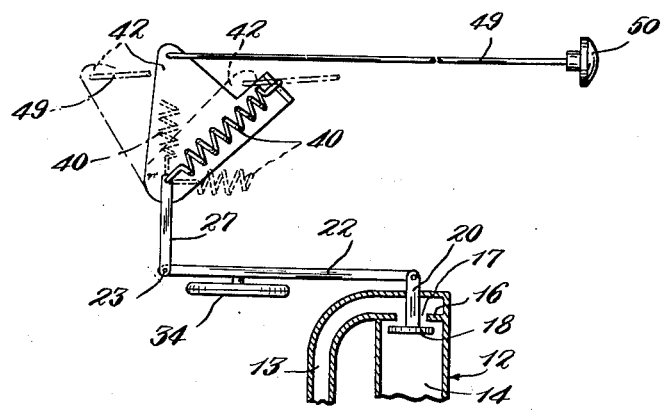
Fig. 3 is a diagrammatic view of the valve mechanism.

A closed, expansible thermostatic element 34 is attached to the plate 10 and is adapted to move the lever 22 in a counterclockwise direction, as viewed in Figs. 1 and 3. The element 34 comprises two cup shaped flexible members arranged having the open sides facing one another and the peripheral edges telescoped and joined by a hermetic seal. The element 34 contains a suitable vapor charge, such as methyl chloride or sulphur dioxide, the pressure of which varies in accordance with the changes in temperature at the element. A plate 35 is attached to the upper side of the pressure responsive element and has a pair of spaced upwardly projecting lugs 37, 38 which extend through openings formed in the lever 22 for receiving the lugs so that proper alignment is maintained between the lever and element. The lugs 37, 38 each has an inwardly projecting shoulder 39 which bears against the underside of the lever 22. It will be seen that as the pressure within the element 34 increases, it tends to expand and move the lever 22 counter-clockwise and move the valve plate 18 to close the port 17.

The lever 22 is adapted to be rotated counter-clockwise against the pressure responsive element 34 to open the valve by a spring 40. The spring 40 preferably comprises a coiled wire, one end of which is provided with a hook formation 41 which is engaged with the pin 32 so that the spring may pivot in the plane of the lever 22. The opposite end of the spring 40 is attached to a U-shaped member 42 by an adjustable device comprising a bolt 43 extended through an opening in the yoke of the member 42. The bolt head is larger than the opening and serves to anchor the bolt to the member 42. A nut 44 is threaded on the bolt 43 and has external threads which receive the end convolutions of the spring to attach the spring to the nut. The proper tension of the spring can be set during the manufacture of the mechanism, by turning the bolt 43 to move the nut 44 therealong to the position which provides the spring tension desired.

The end of the spring 40 connected with member 42 is adapted to be swung through nearly 90° in the plane of lever 22, and the open ends of the member are pivotally supported to the respective side walls of the frame 11 by pins, 45, 46. The top wall of the frame 11 has an opening 47 through which the outer end of member 42 projects when it is swung upwardly, and the counter-clockwise movement of the member is limited by engagement with an edge of the opening, as seen in Fig. 1. Preferably, the pivot pins 45, 46 are substantially aligned with pin 32, the purpose of which is explained hereinafter.

One side of the member 42 is triangular and a relatively stiff wire 49 is attached thereto. The wire 49 is preferably enclosed throughout a substantial portion thereof in a flexible sheath 51 and is extended to a suitable location where it can be reciprocated by a knob 50 attached thereto. The sheath 51 enables the wire to be supported by brackets and to be reciprocated longitudinally to swing the member 42 through approximately 90°. The member 42 is adapted to support the spring 40 so that when the member is at one limit of its movement the spring axis is substantially coincident with a line extending through the centers of pivot pin 23 and pin 32, and when the member is at the other limit of its movement the spring axis is substantially normal to the line through pins 23 and 32. By this arrangement, the spring tension tending to rotate the lever 22 clockwise and in opposition to the pressure responsive element 34 increases from substantially zero to a maximum as the spring is swung from the position shown in full lines to that shown in broken lines in Fig. 1, the positions shown being at the limits of movement of the member 42. Thus, a wide range of pressures opposing the element 34 may be obtained merely by swinging member 42 on its pivot which requires but slight effort.

The axis of pivots 45, 46 for member 42 is located as nearly as possible in line with the axis of pin 32 so that the reaction of spring 40 on the member 42 has no appreciable tendency to rotate the member from any of the positions in which it is set. As the lever 22 is oscillated, the axes of the pivots 45, 46 and the pin 42 are slightly misaligned but not sufficiently to cause the spring tension to rotate the member 42 inasmuch as the component of rotation is small and cannot overcome the friction of the pivots 45, 46 and the friction between the wire 49 and its sheath 51.

It will be seen that by my invention I have provided an adjustable control mechanism having an arrangement whereby the effective spring tension on the pressure responsive element can be altered throughout a wide range with relatively little manual exertion, and the manual adjustment settings made from time-to-time are unaffected by operation of the control mechanism.

Although I have shown but one form of the invention, it is to be understood that other forms could be adopted all falling within the scope of the claim which follows.

Having thus described my invention, I claim:

In a control mechanism, a base plate, a control device on said base plate, a housing attached to said base plate and including two opposed side walls, a lever carried between said side walls and having a portion extending generally parallel with said base plate and connected with said control device, pivot means supported by said side walls and pivotally supporting said lever, a pressure responsive expansible element on said base plate engaging said portion of said lever at a point intermediate said pivot means and the part of said lever connected to said control device, said lever having an arm extending laterally thereof adjacent to the pivoted part, a U-shape member pivoted between said side walls, pivot means for said member carried by said side walls for pivotally supporting the sides of said U-shape member on said side walls on an axis parallel to the pivotal axis of said lever, a tension spring having one end pivotally connected to said arm of said lever approximate to the axis of the pivot of said U-shape member, adjusting means interconnecting the other end of said spring and the yoke of said member for adjusting the length of said spring, and means to selectively position said U-shape member about its pivot to shift said spring about its pivotal connection with said arm of said lever.

ELDON D. RANEY.

REFERENCES CITED

The following references are of record in the file of this patent:

UNITED STATES PATENTS

| Number | Name | Date |
|---|---|---|
| 1,937,135 | Wood | Nov. 28, 1933 |
| 2,435,577 | Dawson | Feb. 10, 1948 |
| 2,437,883 | Mallory | Mar. 16, 1948 |
| 2,499,256 | Payne | Feb. 28, 1950 |

FOREIGN PATENTS

| Number | Country | Date |
|---|---|---|
| 419,210 | Great Britain | Nov. 5, 1934 |